United States Patent [19]

Iwaya et al.

[11] Patent Number: 4,896,436
[45] Date of Patent: Jan. 30, 1990

[54] SPRAY DRYING PROCESS AND APPARATUS THEREFOR

[75] Inventors: Shoichi Iwaya; Hitoshi Masumura; Hiroki Takahashi, all of Tokyo; Masaaki Ohkawara, Yokohama; Katsumi Kobayashi, Yokohama; Takashi Ito, Yokohama, all of Japan

[73] Assignees: TDK Corporation, Tokyo; Ohkawara Kakohki Co., Ltd., Yokohama, both of Japan

[21] Appl. No.: 182,604

[22] Filed: Apr. 18, 1988

Related U.S. Application Data

[62] Division of Ser. No. 947,245, Dec. 29, 1985, Pat. No. 4,809,442.

[30] Foreign Application Priority Data

Dec. 27, 1985 [JP] Japan ................... 60-292557
Aug. 28, 1986 [JP] Japan ................... 61-200004

[51] Int. Cl.$^4$ .................. F26B 19/00; B01D 1/22
[52] U.S. Cl. ........................ 34/60; 159/4.01; 159/16.1; 159/DIG. 2; 159/DIG. 28; 34/57 R; 34/10
[58] Field of Search .............. 34/57 R, 10, 47, 60; 159/48.1, 4.01, DIG. 3, 3, DIG. 2, 16.1, 4.4, 16.3, 4.05, DIG. 28; 202/236; 203/90

[56] References Cited

U.S. PATENT DOCUMENTS 3,648,753  3/1972  Bergquist .................. 34/227 X
4,702,799  10/1987  Tuot ....................... 34/57 R X

*Primary Examiner*—Henry A. Bennet
*Attorney, Agent, or Firm*—Armstrong, Nikaido, Marmelstein, Kubovcik & Murray

[57] ABSTRACT

The spray drying process and the apparatus therefor, of the present invention use a spray drying chamber formed by a heat-resistant porous membrane. Said porous membrane enables rapid separation of a discharge gas and a produced powder and accordingly total recovery of the produced powder from the spray drying chamber. Therefore, there occurs no nonuniformity in product composition; cleaning and blowing-off of adhered fine powder can be conducted rapidly and easily even in frequent product changes inevitable with a less grade larger quantity production system; as a result, a fine powder of higher quality and higher purity can be produced.

3 Claims, 6 Drawing Sheets

SPRAY DRYING PROCESS AND APPARATUS THEREFOR

This is a division of application Ser. No. 947,245 filed Dec. 29, 1985, now U.S. Pat. No. 4,809,442.

BACKGROUND OF THE INVENTION

1. Technical Field

The present invention relates to a spray drying process and an apparatus therefor. More particularly, the present invention relates to a spray drying process and an apparatus therefor, both using a spray drying chamber formed by a porous membrane.

2. Background Art

Spray drying processes and apparatuses therefor basically have three essential functions, namely, (1) spraying of a feed liquid to form microdrops, (2) drying of the microdrops to produce a powder and (3) separation and recovery of the powder product. These spray drying apparatuses are ordinarily equipped with an atomizer, a drying chamber and a fine powder collector to perform each of said functions.

Figure 9:
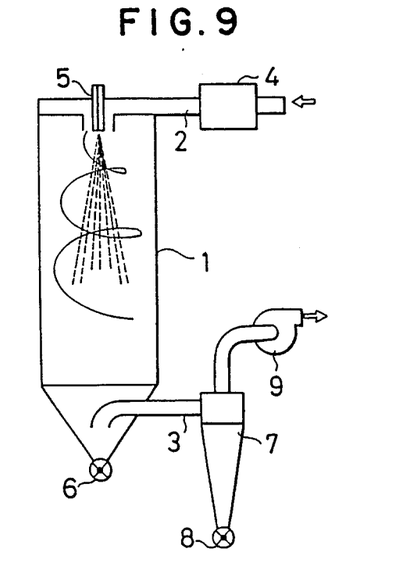
FIG. 9 and FIG. 10 are schematic sectional views showing conventional spray drying apparatuses.
Figure 10:
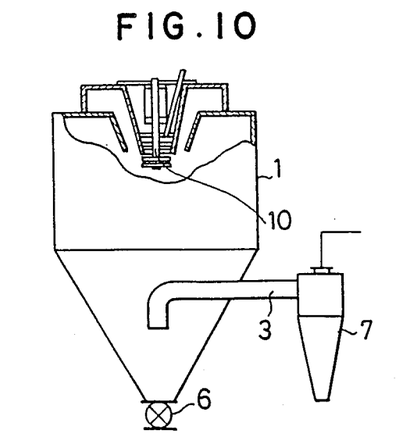

As examples of the spray drying apparatuses, there have conventionally been popular those shown in FIG. 9 and FIG. 10. (Reference is made to Japanese Patent Publication No. 32601/1983 and Japanese patent application Kokai (Laid-Open) No. 26950/1983.)

In the spray drying apparatus of FIG. 9, in a drying chamber 1, a feed liquid is sprayed from a nozzle 5 and momentarily heated by hot gas (heated air) blown from a hot gas inlet 2, whereby the liquid component of the feed liquid is evaporated and the solid component is converted to a fine (dried) powder. The majority of the fine powder is taken out as a product through a rotary valve 6, but part of the fine powder is carried by an exhaust gas into a cyclone collector (hereinafter referred to as "a cyclone") through a discharge gas outlet 3 and recovered from a rotary valve 8.

The spray drying apparatus of FIG. 10 is same as that of FIG. 9 except that as the atomizer, a rotary spraying disc 10 is used in place of the nozzle 5.

In the spray drying apparatuses of the type as shown in FIG. 9 and FIG. 10, a fine powder as a product is recovered in two portions from the apparatus main body (drying chamber) and the cyclone, respectively. In this case, the portion of the product having a heavier weight and larger particle diameters are taken out from the apparatus main body (drying chamber) and the portion of the product having a lighter weight and smaller particle diameters from the cyclone. Hence, there occurs a slight nonuniformity in product composition.

This nonuniformity in product composition has hitherto presented no serious problem, depending upon the kind of the product.

Meanwhile, recently in the spray drying processes and the apparatuses therefor, use of a more grade and smaller quantity production system in addition to the conventional less grade larger quantity production system has become more frequent than before for the production of medicines, fine ceramics, etc.

Moreover, the production of higher purity products has become more frequent in said processes and apparatuses.

Under the increased requirements for the more grade smaller quantity production system as well as for higher purity products, a new problem has arisen in addition to the slight nonuniformity in product composition which has not been considered as a major problem.

That is, the more grade smaller quantity production system requires more frequent product change, which in turn requires rapid and complete cleaning of a solid which has adhered to the inner wall of a drying chamber. Such cleaning is necessary because (1) efficient operation of the more grade smaller quantity production system requires a cleaning time as short as possible and (2) production of higher purity and higher quality products requires complete cleaning of an adhered solid at each product change. In actuality, complete cleaning is extremely difficult. Moreover, when the product is harmful to human bodies, direct contact with the product must be avoided making the cleaning very difficult.

Further, the slight nonuniformity in product composition has become a more serious problem in connection with the increased requirement for higher purity products.

SUMMARY OF THE INVENTION

Hence, an object of the present invention is to provide a spray drying process suited for more grade smaller quantity production, as well as an apparatus therefor.

Another object of the present invention is to provide a spray drying process capable of producing a fine powder of high purity, as well as an apparatus therefor.

Still another object of the present invention is to provide a spray drying process capable of effecting spray drying with smaller total facility, as well as an apparatus therefor.

The spray drying process of the present invention uses a spray drying chamber formed by a heat-resistant porous membrane and this porous membrane enables highefficiency separation of a discharge gas and a produced powder; whereby a total amount of the powder product can be obtained directly from the spray drying chamber.

The spray drying apparatus of the present invention uses a spray drying chamber formed by a heat-resistant porous membrane and equipped with an inlet for heated air, an outlet for discharge gas, an outlet for powder product and a means for atomization of feed liquid.

The present invention further provides a spray drying apparatus of integration type wherein at least one spray drying chamber formed by a heat-resistant porous membrane is accommodated in a housing. This apparatus comprises a housing having upper and lower rooms. In the upper room, there are arranged at least one unit for generation of hot gas, at least one unit for distribution of hot gas, at least one unit for atomization of feed liquid and at least one unit for exhaust gas. In the lower room, at least one unit for recovery of produced powder is arranged movably. Between each feed liquid atomization unit in the upper room and each corresponding produced product recovery unit in the lower room, there is detachably arranged one spray drying chamber formed by a heat-resistant porous membrane.

The porous membrane used in the present invention is preferred to have a bag-like or cylindrical shape. In addition, the membrane must be heat-resistant and it is preferable to be excellent in powder releasability.

That is, hot gas is introduced into the spray drying chamber at an ordinary inlet temperature of about 120° C. to 280° C. and leaves the chamber at an ordinary outlet temperature of about 70° to 150° C.; therefore, the porous membrane must withstand such a high temperature. Further, since a fine powder constantly adheres to and deposits on the porous membrane, the membrane is preferred to be excellent in powder releasability in order to allow its continuous use. Furthermore, the porous membrane has a function of separating a fine powder produced and an exhaust gas.

The porous membrane having such requirements has no particular restriction with respect to the type. However, there are ordinarily used fiber-made cloths or laminates each consisting of two different such cloths. Preferably, there are used laminates of (1) a powder-releasable, reticulate membrane and (2) a woven or unwoven cloth as a reinforcing material. Preferable examples of the reticulate membrane are a membrane of polytetrafluoroethylene (PTFE) (brand name: Teflon) type and a polytrifluoroethylene type membrane, and preferable examples of the woven or unwoven cloth are cloths made from a polyimide, a heat-resistant nylon, a polyester or an aramid.

In the present invention, the whole portion of the spray drying chamber is formed by a single porous membrane. This makes detaching of the chamber easy and accordingly its maintenance very simple.

In the bag-like or cylindrical spray drying chamber formed by a porous membrane, a feed liquid is sprayed to form microdrops and the microdrops are momentarily dried by hot gas blown from its inlet and having an inlet temperature of 120° to 280° C. to be converted into a fine powder and a gas. A part of the fine powder deposits on the bottom of the spray drying chamber owing to the own weight, while the gas is separated from the rest of the fine powder by being passed through the pores of the porous membrane and is discharged outside through an outlet for exhaust gas. Hence, the total portion of the fine powder is separated from the gas and, as a result, there occurs no nonuniformity in the composition of the fine powder product.

Continuous operation of the porous membrane causes adhesion and deposition of a fine powder to and on the membrane, increase in pressure drop and finally stoppage of operation. In order to avoid this, the fine powder need be taken off as necessary. Since the porous membrane in general has excellent powder releasability, the adhered powder can be easily removed from the porous membrane in a short time by mechanical vibration, air injection from the opposite side (pulse air or reverse jet) or the like. When complete removal (cleaning) of the powder from the membrane without causing contamination with impurities is required, it can be done by replacing the porous membrane with a new one from outside without touching the product inside the membrane. This replacement is easy when the porous membrane has a bag-like shape.

Separation of a fine powder and a gas by the porous membrane is ordinarily conducted by passing a gas containing a fine powder through the meshes of the fiber constituting the porous membrane and allowing the fine powder to remain on the meshes. In actuality, however, this filtration is not simple. The meshes are usually many times as large as the particle sizes of the fine powder; accordingly, the fine powder is collected not only on the surface of the filtration cloth but also partially inside the cloth. In the present invention, such a filter cloth is used primarily for a fine powder of good solubility. Preferably, the porous membrane used in the present invention is a laminate of (1) a reticulate membrane as mentioned previously, having good powder releasability and capable of conducting surface filtration and (2) a woven or unwoven cloth as mentioned previously, of excellent heat resistance and strength as a carrier for the membrane (1). The effect of the present invention can be enhanced by the use of such a laminate. The diameters of the particles which can be captured by the porous membrane of the present invention can vary from 0.1 μm to several millimeters.

BRIEF DESCRIPTION OF THE DRAWINGS

FIG. 1 shows an example of the spray drying apparatus of the present invention.

FIG. 7 shows another example of the spray drying apparatus of integration type according to the present invention wherein each unit of the apparatus is accommodated in a housing.

DETAILED DESCRIPTION OF PREFERRED EMBODIMENTS

Figure 1A:
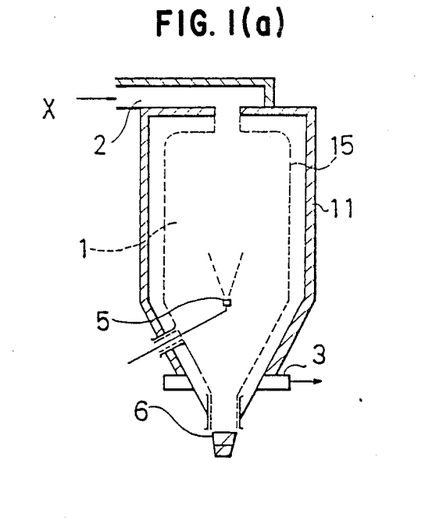
FIG. 1(a) is a schematic sectional view of the whole portion of the apparatus and FIG. 1(b) is a partially enlarged sectional view of the porous membrane used in the apparatus.
Figure 1B:
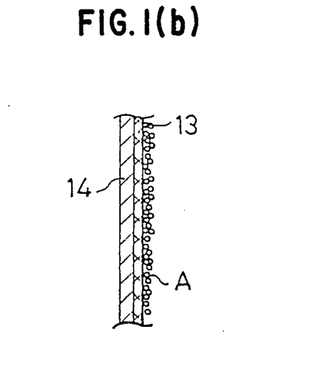

FIG. 1 shows an embodiment of the spray drying apparatus of the present invention for carrying out the spray drying process of the present invention. FIG. 1(a) is a schematic sectional view of the whole portion of the apparatus and FIG. 1(b) is a partially enlarged sectional view of the porous membrane forming the spray drying chamber of the apparatus. In FIG. 1, a spray drying chamber 1 formed by a bag-like porous membrane 15 is arranged inside the main body 11 of the spray drying apparatus along the inner wall of the main body 11. As shown in FIG. 1(b), the porous membrane 15 is constituted by a laminate of a reticulate membrane 13 and a filter cloth 14 as a reinforcing material. Hot gas X is sent into the spray drying chamber 1 from the top of the main body 11 through an inlet 2 and is allowed to make counterflow contact with a feed liquid sprayed upward from the lower portion of the spray drying chamber 1 through a nozzle 5. A fine powder produced enters a product receiver (not shown) from an outlet 6 of seal valve type. A gas after drying is separated from a fine powder A via the porous membrane 15 forming the outer wall of the spray drying chamber 1 and is then discharged outside from a discharge gas outlet 3 installed at the lower portion of the main body 11.

Figure 2:
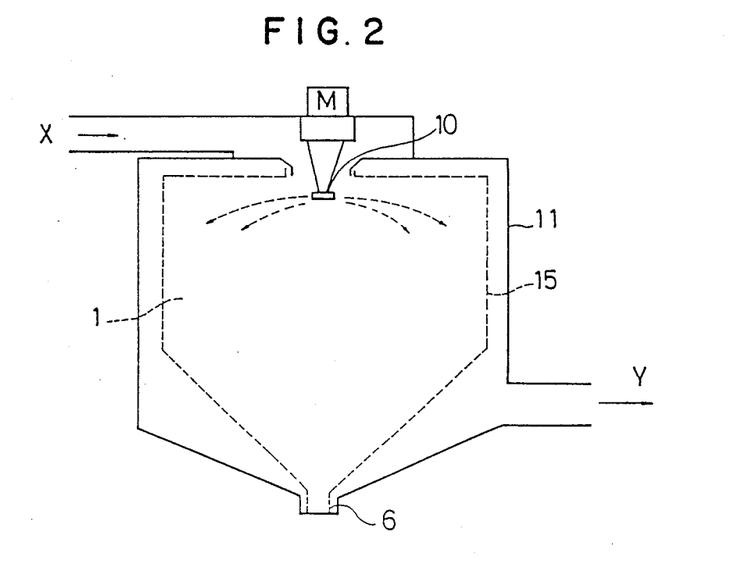
FIG. 2 to FIG. 5 are schematic sectional views showing other examples of the spray drying apparatus of the present invention.

FIG. 2 is a schematic sectional view showing other embodiment of the spray drying apparatus of the present invention. FIG. 2 is different from FIG. 1 in that a rotary spraying disc 10 is used as an atomizer, in place of the nozzle 5 and both hot gas X and a feed liquid from the rotary spraying disc 10 are introduced downward as parallel flows. In other respects, the structure of the apparatus of FIG. 2 is approximately same as that of FIG. 1.

Figure 3:
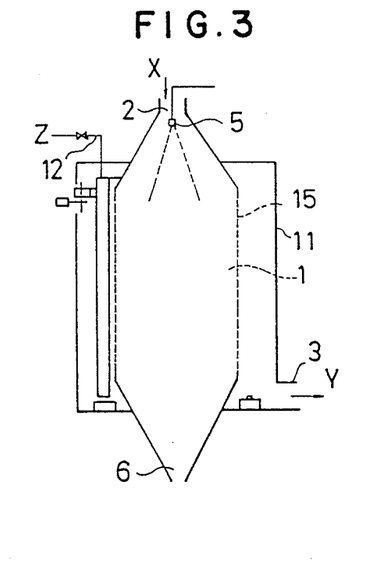
Figure 4:
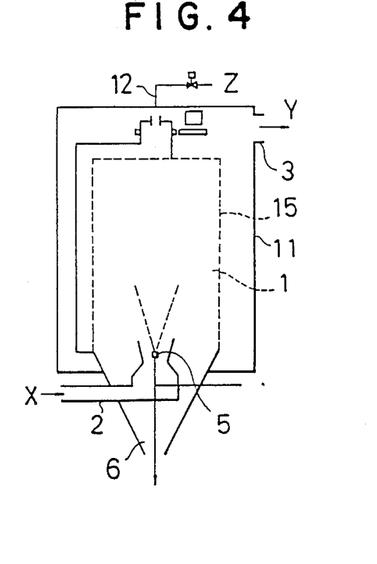
Figure 5A:
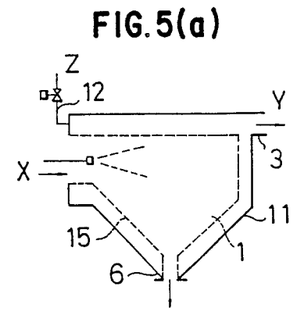
Figure 5B:
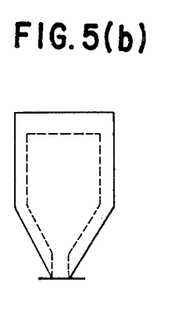

FIG. 3 to FIG. 5 are schematic sectional views also showing other embodiments of the spray drying apparatus of the present invention. In FIG. 3, hot gas X and a feed liquid from a nozzle 5 are introduced downward as parallel flows. In FIG. 4, hot gas X and a feed liquid from a nozzle 5 are introduced upward as parallel flows. In FIGS. 5(a) and (b), hot gas X and a feed liquid from a nozzle 5 are introduced from the side of the spray drying chamber 1.

In each of the apparatuses of FIGS. 3 to 5, there is provided a blow-off mechanism Z (reverse jet and pulse air type) for blowing off a fine powder produced. For instance, pulse air is sent into a main body 11 from the opposite direction through a line 12, whereby a fine powder A which has adhered to a porous membrane 15 is blown off.

Figure 6:
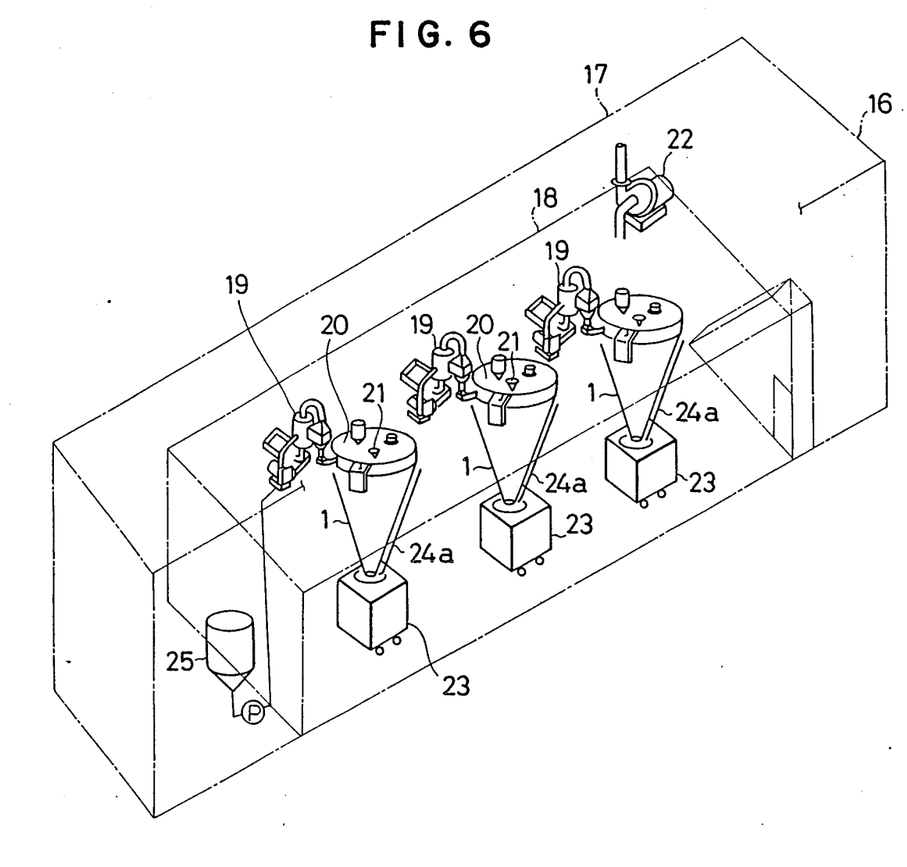
FIG. 6 is a perspective view showing an example of the spray drying apparatus of integration type according to the present invention wherein each unit of the apparatus is accommodated in a housing.
Figure 7A:
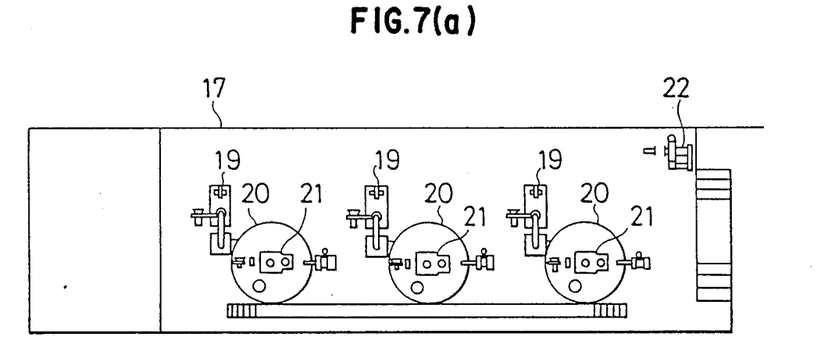
FIG. 7(a) is a plan view of the upper room of the housing and FIG. 7(b) is a plan view of the lower room of the housing.
Figure 7B:
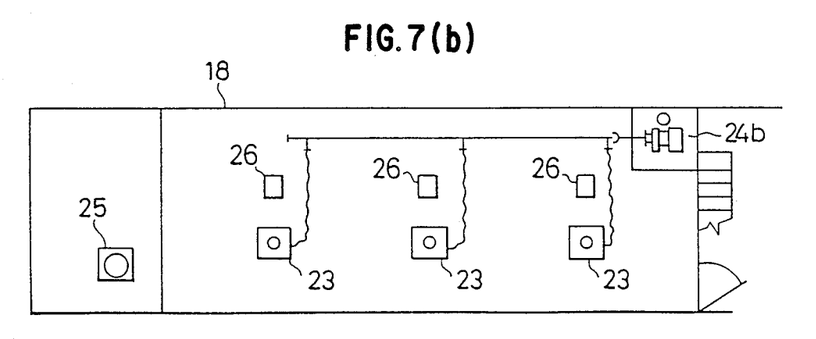

FIG. 6 and FIG. 7 each shows an embodiment of the spray drying apparatus of integration type according to the present invention wherein each unit of the apparatus is accommodated in a housing. FIG. 6 is a perspective view of the whole portion of the apparatus. FIG. 7(a) is a plan view of the upper room of the housing of the apparatus. FIG. 7(b) is a plan view of the lower room of the housing of the apparatus. In FIGS. 6 and 7, a housing 16 consists of an upper room 17 and a lower room 18. In the upper room 17, there are arranged each three sets of units 19 for generation of hot gas, units 20 for distribution of hot gas and units 21 for atomization of feed liquid, as well as one common unit 22 for exhaust gas. In the lower room 18, there are arranged, below the feed liquid atomization units 21, the same sets (i.e. three sets) of units 23 for recovery of fine powder product. In the lower room 18, there are further arranged units 24a and 24b for blowing-off of fine powder and a unit 25 for preparation of feed liquid. Between the feed liquid atomization units 21 in the upper room and the corresponding fine powder recovery units 23 in the lower room, there are arranged the same sets (i.e. three sets) of spray drying chambers 1. A large number of bag-like porous membranes each to be used as a spray drying chamber 1 are stored in the lower room.

Figure 8:
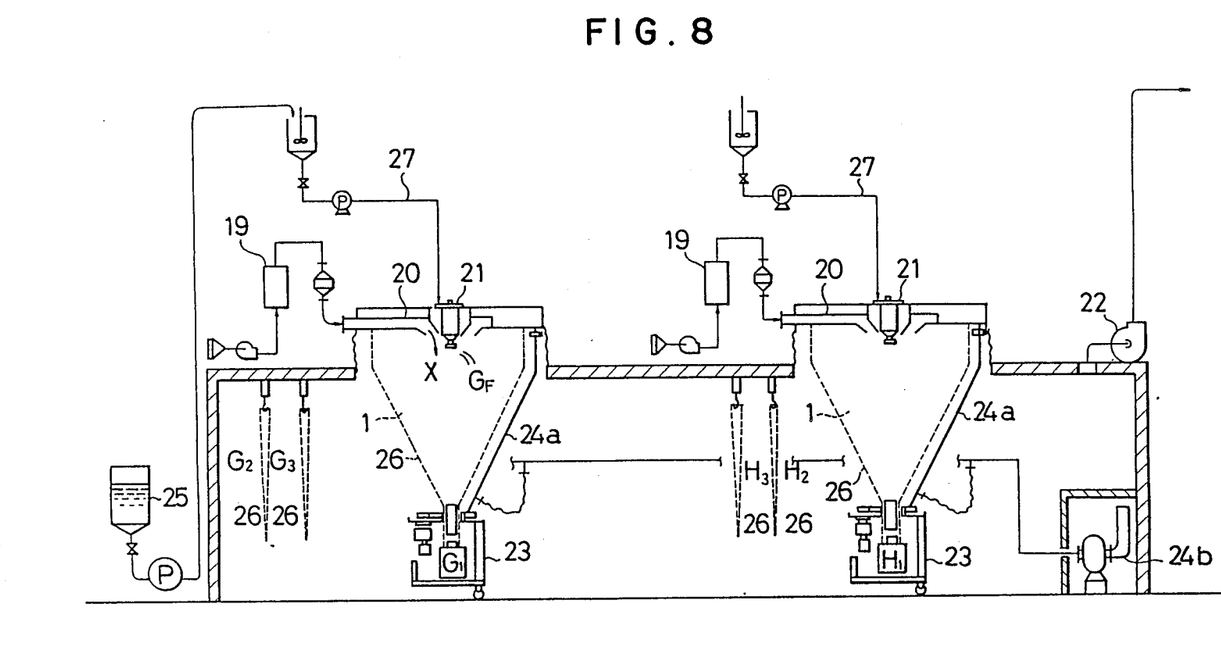
FIG. 8 is a drawing explaining an example of the operation of the spray drying apparatus of integration type according to the present invention wherein each unit of the apparatus is accommodated in a housing.

Referring to FIG. 8, there is explained the operation of the spray drying apparatus of integration type according to the present invention. The apparatus of FIG. 8 accommodates two sets of spray drying chambers for producing different products G and H. Explanation is made on one set. A feed liquid $G_F$ supplied from a feed liquid preparation unit 25 through a pipe 27 is sprayed into a drying chamber 1 by a feed liquid atomization unit 21 to form microdrops, and the microdrops are momentarily dried by hot gas X blown from a hot gas generation unit 19 through a hot gas distribution unit, to be converted into a fine powder and a vapor. The fine powder is recovered as a product $G_1$ by a fine powder receiver 23. When the product to be produced next is $G_2$ or $G_3$ of different grade but similar to $G_1$, the porous membrane constituting the spray drying chamber 1 is removed and can be rapidly replaced by a porous membrane of exclusive use for $G_2$ or $G_3$ which is stored nearby. Another set is also operated in the basically same manner.

Meanwhile, the gas is separated from the fine powder through the pores of the porous membrane 26 and is discharged outside from a common discharge unit 22.

The spray drying apparatus and the apparatus therefor according to the present invention will be explained in more detail below by way of Examples.

(Example 1)

Using a spray drying apparatus of the type shown in FIG. 1, a feed liquid containing 60% of stabilized zirconia ($Ca_{0.15}Zr_{0.85}O_{1.85}$) or 70% of lanthanum-added barium titanate [$BaTiO_3 + 0.01(La_2O_3)$] was sprayed at a rate of 150 kg/hr. The drying chamber of the apparatus had dimensions of 2,500 mm in diameter, 2,500 mm in straight body height and 4,300 mm in total height, and had a cylindrical shape at the upper portion and a cone shape at the lower portion. The porous membrane forming the drying chamber was a laminate of a heatresistant unwoven nylon cloth and a polytetrafluoroethylene. The inlet temperature of heated air was 220° C. and the exhaust gas temperature was 120° C..

Under the above conditions, the spray drying operation of each feed liquid was conducted. As a result, the fine powder products obtained had the following properties.

|  | (1) | (2) |
| --- | --- | --- |
| Average particle diameter | 50 μm | 60 μm |
| Water content | 0.3% | 0.7% |
| Nonuniformity in composition | None | None |
| Yield after 4 hours of operation | 99% | 99% |

In the above, (1) refers to stabilized zirconia and (2) refers to lanthanum-added barium titanate.

The time required for product change was as short as about 40 minutes.

(Example 2)

Using a spray drying apparatus of the type shown in FIG. 8, a feed liquid containing 70% of lanthanumadded barium titanate [$BaTiO_3 + 0.01$, 0.015 or $0.02(La_2O_3)$] was sprayed at a rate of 100 kg/hr. The drying apparatus was of G type. The drying chamber of the apparatus had dimensions of 2,000 mm in diameter, 500 mm in straight body height and 3,500 mm in total height, and had a cylindrical shape in the upper portion and a cone shape in the lower portion. The porous membrane forming the drying chamber was a laminate of a heat-resistant unwoven nylon cloth and a polytetrafluoroethylene. Each one membrane was used for each feed liquid.

The inlet temperature of heated air was about 220° C. and the exhaust gas temperature was 120° C..

Under the above conditions, the spray drying operation of each feed liquid was conducted. As a result, the fine powder products had the following properties.

|  | (1) | (2) | (3) |
| --- | --- | --- | --- |
| Average particle diameter | 50 μm | 25 μm | 50 μm |
| Water content | 0.5% | 0.4% | 0.5% |
| Nonuniformity in composition | None | None | None |
| Yield after 4 hours of operation | 99% | 99% | 99% |

In the above, (1) refers to the case of 0.01% lanthanum addition; (2) refers to the case of 0.015% lanthanum addition; and (3) refers to the case of 0.02% lanthanum addition.

The time required for product change was as short as about 30 minutes.

In this Example, cleaning at the time of product change was conducted only for the atomizer. The drying chamber was folded up and hanged down from a hook of exclusive use, so as to be able to be used in next drying.

As appreciated from the foregoing, the spray drying apparatus of the present invention uses a spray drying chamber formed by a porous membrane; as a result, there takes place no discharge, out of the apparatus, of the portion of a powder product having smaller particle diameters together with an exhaust gas, as experienced with the conventional spray drying apparatuses. Therefore, there is no nonuniformity in product composition; cleaning and blowing-off of adhered fine powder can be conducted rapidly and easily even in frequent product change inevitable with a more grade smaller quantity production system; as a result, a fine powder of higher quality and higher purity can be produced.

In the spray drying apparatus of integration type according to the present invention wherein several spray drying chambers are accommodated in a housing, there are also arranged in the housing each several sets (each set has about the same size) of other necessary units such as hot gas generation units, hot gas distribution units and feed liquid atomization units and there are further stored in the housing a large number of porous membranes for each different product. Such a spray drying apparatus can provide the same performance as several tens of conventional spray drying apparatuses, with a far smaller land area and a far lower facility cost.

As stated above, the spray drying process and apparatus of the present invention can produce a fine powder of high purity, is suited for use in a more grade smaller quantity production system, and accordingly can be preferably utilized in the production of high purity products such as medicines and fine ceramics.

What is claimed is:

1. A spray drying apparatus, comprising: a housing having upper and lower rooms wherein the upper room comprises at least one unit for generation of hot gas, at least one unit for distribution of hot gas, at least one unit for atomization of feed liquid and at least one unit for discharge gas being arranged, wherein the lower room comprises at least one unit for recovery of produced powder being movably arranged, wherein said upper room has at least one spray drying chamber formed by a heat-resistant porous membrane means for allowing said hot gas to pass through said porous membrane means from an inside portion to an outside portion of said spray drying chamber to thereby permit adherence of said powder thereto, wherein said porous membrane means is removable from said spray drying chamber for recovery of said powder which has adhered thereto, and wherein the spray drying chamber is in between each feed liquid atomization unit in the upper room and each corresponding produced powder recovery unit in the lower room.

2. A spray drying apparatus according to claim 1, wherein the porous membrane has a bag-like or cylindrical shape.

3. A spray drying apparatus according to claim 1, wherein said porous membrane has a cylindrical shape.

* * * * *

UNITED STATES PATENT AND TRADEMARK OFFICE
CERTIFICATE OF CORRECTION

PATENT NO. : 4,896,436

DATED : January 30, 1990

INVENTOR(S) : IWAYA et al

It is certified that error appears in the above-identified patent and that said Letters Patent is hereby corrected as shown below:

On the cover page, Item [62], "Dec. 29, 1985" should read --Dec. 29, 1986--.

Signed and Sealed this

Twenty-first Day of May, 1991

Attest:

HARRY F. MANBECK, JR.

*Attesting Officer*     *Commissioner of Patents and Trademarks*